March 10, 1925.  
L. D. SULLIVAN  
AUTOMOBILE BRAKE  
Filed April 3, 1922  
1,529,326
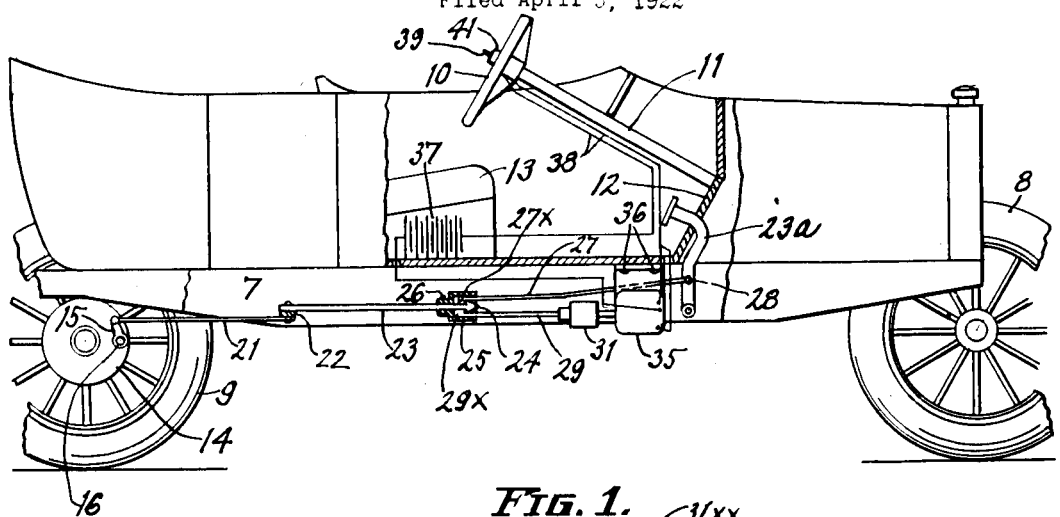
FIG. 1.
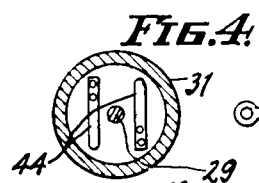
FIG. 4.
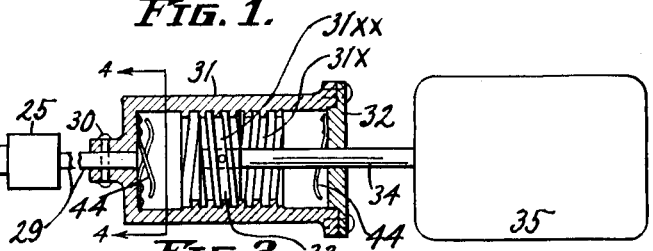
FIG. 3.
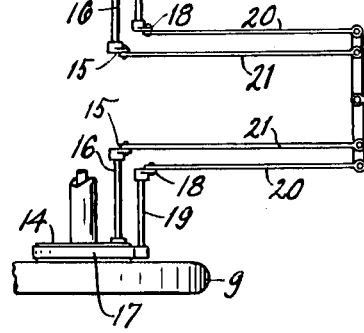
FIG. 2.
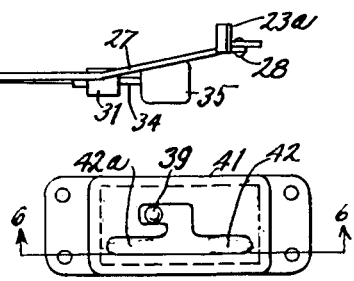
FIG. 5.
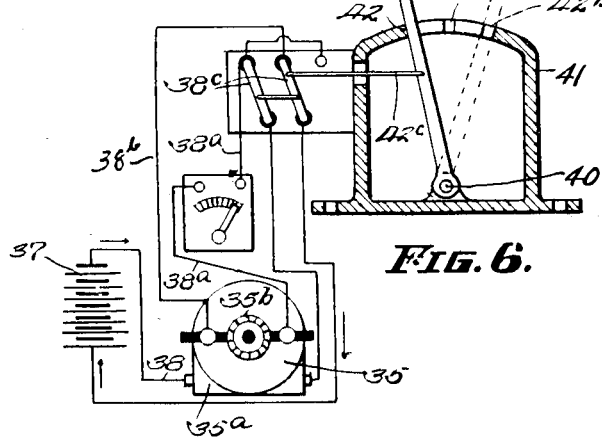
FIG. 6.
FIG. 7.
INVENTOR:  
Leo D. Sullivan Patented Mar. 10, 1925.

1,529,326

UNITED STATES PATENT OFFICE.

LEO D. SULLIVAN, OF ST. PAUL, MINNESOTA.

AUTOMOBILE BRAKE.

Application filed April 3, 1922. Serial No. 548,909.

*To all whom it may concern:*

Be it known that I, LEO. D. SULLIVAN, a citizen of the United States, residing at St. Paul, in the county of Ramsey and State of Minnesota, have invented a new and useful Automobile Brake, of which the following is a specification.

My invention relates to automob le brakes and the object is to provide an efficient and reliable device easily attached to standard makes of both pleasure cars and trucks.

In the accompanying drawing:

Fig. 1 is a partly sectional right side elevation of a "pleasure-car" automobile, some of the body parts and brake mechanism parts omitted as also the near side wheels to expose the parts important to be shown.

Fig. 2 is a top view of my device and adjacent parts of the emergency and service brakes on the rear axle of an automobile.

Fig. 3 is a longitudinal partly sectional and enlarged bottom view of the main working parts of my device as shown in Fig. 1.

Fig. 4 is a sectional elevation on line 4—4 in Fig. 3.

Fig. 5 is a top view of the electric control box of my device.

Fig. 6 is a partly diagrammatic sectional elevation on line 6—6 in Fig. 5 showing also the reversing means more fully.

Fig. 7 is an enlarged portion of Fig. 1.

Referring to the drawing by reference numerals, in Fig. 1, 7 is the chassis. 8 the front wheels, 9 the rear wheels, 10 the steering wheel, 11 the steering column, 12 the foot board and 13 the front seat of an automobile of the pleasure car type having an expansion type brake (not shown) encased in a housing 14 secured to rear wheel and said brake is operated by a lever 15 secured on a shaft 16 projecting from said housing.

In Fig. 2 the rear wheels 9 (only one is shown) has the usual brake drum 14 in which the expansion type of brake above described is used, and also an external contracting brake, comprising a band 17 contracted or expanded by the usual means (not shown) and operated by a rocker arm 18 and rock shaft 19 for each band 17. Forwardly extending rods 20 pivotally connected to the rocker arms 18 and similar rods 21 connected to rocker arms 15 are all secured at their forward ends to an equalizer bar 22. The single brake system illustrated in Fig. 1 has a similar equalizer bar 2º

The construction thus far described is common to many makes of cars and in others the equivalent of bar 22 is a rock shaft (not shown) but both are operated by another forwardly projecting bar 23 usually manipulated by the foot brake 23ª or an emergency brake (not shown) located near the driver's seat.

My device comprises new means for pulling on the equalizer bar 22 to operate the brake or brakes and is of the following construction:

In my device the forward end of rod 23 is shaped like an arrow head 24 normally concentric with and incased in a forwardly opening shell 25 secured on rod 23 to the rear of head 24 as at 26. The shoulder of head 24 is engaged at one side by a hook 27ˣ formed on the rear end of a rod 27, the forward end of which is pivotally secured as at 28 to the foot lever 23ª. The other side of said arrow head 24 is likewise arranged to be engaged by another hook 29ˣ formed on the rear end of a rod 29 the front end of which (see Fig. 3) is secured as at 30 in the rear end of a metallic cylindrical housing 31 having a cap 32 secured to its front end and having an oil tight fit. The inside and central part of the housing is provided with internal threads 31ˣ normally engaged by corresponding threads 31ˣˣ on a piston 33 having a piston rod 34 projecting forwardly through an aperture in the cap 32. Said piston rod is merely an extension of the axle or shaft of an electric motor of which I have illustrated only the housing 35 secured as at 36 on the frame of the automobile. The motor is rotated by current furnished by a battery 37, through circuit wires 38 to the field 35ª, and wires 38ª to the armature 35ᵇ and returned to the battery over wire 38ᵇ after being controlled by a regular reversing switch 38ᶜ, which is connected by a link rod 42ᶜ to a control lever 39, pivoted at 40 in a control box 41, which is mounted in any suitable manner on or near the steering wheel 10.

The box 41 has a so-called H-slot permitting the lever 39 to be swung into either one of three notches, 42, 42ª, 42ᵇ, whereby the switch is turned to, start, stop and reverse the motor, respectively.

When the driver wishes to apply the brakes, for example, he throws the lever 39 into the notch that will cause the motor to rotate in the desired direction. The turning of the motor shaft 34 and the threaded piston 33 secured thereon and engaging threads 31× of housing 31 causes the latter to be forcibly moved forward and thereby pulls rods 29, 23, and equalizer bar 22 forward and the brakes are speedily set. When the speed of the car has been reduced or it has been stopped, as desired, the driver merely places lever 39 in neutral position near or in the notch 42ª in Fig. 6.

To release the brakes the lever 39 is merely swung into the notch 42ᵇ, which causes the motor to run in the opposite direction and the housing 31, rods 29 and 23 are forced back to original position and the brakes are free to be released by their usual springs (not shown). It will be understood that the cylinder 31 has no threads at either end, (see Fig. 3), and hence when the piston is rotated either way its threads come out of contact with the threads 31×. Both end walls of the cylinder are provided with inwardly projecting leaf springs 44 which tend to push the cylinder with its threads into engagement with the piston again after the full braking or releasing strength has been exerted by the motor.

The foot lever 23ª is ever ready to pull on the arrow-head 24 by the hook 27× of the rod 27, and thus apply the brakes for light braking without using the electric motor; or, the foot lever 23ª may be used in addition to the electrically operated means when some emergency requires hasty and hard setting of the brakes. Whenever only one of the hooks 27× or 29× pulls at the arrow-head, the other hook is received freely into the space or clearance 25× in the guide 25, as best shown in Fig. 7.

Having thus described my invention what I claim is:

1. In combination with the equalizer bar of an auto vehicle brake, of an internally threaded slidable cylinder having operative connection with the equalizing bar, a threaded piston engaging the threads in the cylinder, and a reversible electric motor having its shaft operatively connected with the piston to rotate it, and a hand controlled electric circuit arranged for starting, stopping and reversing the electric motor; said cylinder having an unthreaded portion near each end as a clearance for the piston so it may rotate without moving the cylinder, and springs inside the cylinder for causing it to re-enter the threads of the piston when the rotation of the latter is reversed.

2. The structure specified in claim 1, said operative connection with the equalizer bar comprising two rods, one of which is secured to the equalizer bar and has its free end formed with an arrow-head, the other rod being secured to the slidable cylinder and having its free end hook-shaped and slidable on the arrow-head ready to engage the rear shoulder thereof and pull it forward, and means constantly guiding said overlapping ends of the rods.

3. The structure specified in claim 1, said operative connection with the equalizer bar comprising two rods, one of which is secured to the equalizer bar and has its free end formed with an arrow-head, the other rod being secured to the slidable cylinder and having its free end hook-shaped and slidable on the arrow-head ready to engage the rear shoulder thereof and pull it forward, and means constantly guiding said overlapping ends of the rods; and a foot lever having a rod pivoted to it with one end, the other end being guided by said guiding means and provided with a hook ever ready to engage the rear shoulder of the arrow head to pull it forward when so desired.

4. In an automobile brake, the combination with the braking means proper of a horizontally disposed rod having one end connected thereto and at its other end an arrow head and a hollow guide fixed on the rod and spaced about the arrow head, two reciprocal rods guided in said guide and having each a hook-shaped end adapted to engage the shoulder of the arrow head, a power operated mechanism arranged to operate one of the hook rods and a foot lever arranged to operate the other of said hook rods.

In testimony whereof I affix my signature.

LEO D. SULLIVAN.